US011533292B2

(12) United States Patent
Ochs-Willard et al.

(10) Patent No.: US 11,533,292 B2
(45) Date of Patent: Dec. 20, 2022

(54) AUTOMATED SYNCING OF DATA BETWEEN SECURITY DOMAINS

(71) Applicant: Palantir Technologies Inc., Palo Alto, CA (US)

(72) Inventors: Jess Ochs-Willard, Brooklyn, NY (US); Matthew Brady, Arlington, VA (US); Armando Belardo, Washington, DC (US); Mitchell Skiles, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 181 days.

(21) Appl. No.: 16/992,459

(22) Filed: Aug. 13, 2020

(65) Prior Publication Data

US 2021/0211407 A1 Jul. 8, 2021

Related U.S. Application Data

(60) Provisional application No. 62/958,154, filed on Jan. 7, 2020.

(51) Int. Cl.
*H04L 29/06* (2006.01)
*H04L 29/08* (2006.01)
*G06F 16/178* (2019.01)
*G06F 16/11* (2019.01)
*G06F 16/16* (2019.01)
(Continued)

(52) U.S. Cl.
CPC ........ *H04L 63/0209* (2013.01); *G06F 16/119* (2019.01); *G06F 16/164* (2019.01); *G06F 16/178* (2019.01); *H04L 63/0428* (2013.01); *H04L 63/20* (2013.01); *H04L 67/06* (2013.01)

(58) Field of Classification Search
CPC . H04L 63/0209; H04L 63/20; H04L 63/0428; H04L 67/06; G06F 16/164; G06F 16/178; G06F 16/119
See application file for complete search history.

(56) References Cited

U.S. PATENT DOCUMENTS

| 8,688,749 B1 | 4/2014 | Ducott, III et al. |
| 9,396,209 B2 * | 7/2016 | Fukui ................. G06F 16/1827 |
| 10,469,479 B2 * | 11/2019 | Appiah .................. G06F 21/41 |

(Continued)

FOREIGN PATENT DOCUMENTS

EP 3418919 A1 12/2018

OTHER PUBLICATIONS

"Synchronization of Unique Identifiers Across Security Domains"—Mittrick et al, Army Research Laboratory, Feb. 2009 https://apps.dtic.mil/sti/pdfs/ADA497570.pdf (Year: 2009).*

(Continued)

*Primary Examiner* — Randy A Scott
(74) *Attorney, Agent, or Firm* — Sheppard Mullin Richter & Hampton LLP

(57) ABSTRACT

Described herein are systems, methods, and non-transitory computer readable media for automating the transfer/syncing of datasets or other artifacts from one security domain (e.g., a low security side environment) to another security domain (e.g., a high security side environment) in a seamless manner that complies with requirements of a data transfer mechanism used to transfer data between the two security domains while ensuring data integrity and consistency between the two security domains.

20 Claims, 5 Drawing Sheets

(51) Int. Cl.
*H04L 9/40* (2022.01)
*H04L 67/06* (2022.01)

(56) References Cited

U.S. PATENT DOCUMENTS

2008/0005794 A1* 1/2008 Inoue .................. G06F 21/56
 726/22
2011/0302327 A1 12/2011 Prophete et al.

OTHER PUBLICATIONS

"Understanding Topology Synchronization"—VMWare, May 31, 2019 https://docs.vmware.com/en/VMware-Telco-Cloud-Service-Assurance/2.0.0/sam-deployment-guide/GUID-A466B7BB-AD4E-4C78-B4DC-47D3AB422987.html (Year: 2019).*
Extended European Search Report for EP Application 21150334.7 dated May 3, 2021, 6 pages.

* cited by examiner

AUTOMATED SYNCING OF DATA BETWEEN SECURITY DOMAINS

CROSS-REFERENCE TO RELATED APPLICATION

This application claims the benefit under 35 U.S.C. § 119(e) of U.S. Provisional Application No. 62/958,154, filed Jan. 7, 2020, the content of which is incorporated by reference in its entirety into the present disclosure.

FIELD OF THE INVENTION

The present invention relates generally to communication between security domains, and more specifically, to data transfer between security domains.

BACKGROUND

Different security constraints may be associated with data depending on the nature of the data and who is authorized to access the data. In some scenarios, it may be necessary to transfer data or ensure that data is consistent between different security domains associated with differing levels of data security. Conventional solutions for syncing data between security domains suffer from a number of technical drawbacks. Technical solutions that address these drawbacks are described herein.

SUMMARY

In an example embodiment, a system for automated syncing of data between security domains is disclosed. In an example embodiment, the system includes at least one processor and at least one memory storing computer-executable instructions. The at least one processor is configured to access the at least one memory and execute the computer-executable instructions to perform a series of operations. In an example embodiment, the series of operations includes identifying a dataset to be synced between a first security domain and a second security domain, transferring contents of the dataset from the first security domain to the second security domain, transferring metadata associated with the dataset from the first security domain to the second security domain, and utilizing the metadata to sync a corresponding dataset in the second security domain with the transferred contents of the dataset from the first security domain.

In an example embodiment, the series of operations further includes transferring the contents of the dataset from the first security domain to an output store and transferring the metadata from the first security domain to the output store. In an example embodiment, the output store is located in the first security domain and the contents of the dataset and the metadata are transferred from the output store to the second security domain. In an example embodiment, the output store is located in the second security domain and transfer of the contents of the dataset and the metadata to the second security domain is achieved by transfer of the contents of the dataset and the metadata to the output store.

In an example embodiment, the series of operations further includes generating the dataset in the first security domain by deconstructing data such that the transfer of the contents of the dataset satisfies one or more data transfer limitations associated with a data transfer mechanism used to transfer the contents of the dataset from the first security domain to the second security domain. In an example embodiment, the series of operations further includes reconstructing the dataset in the second security domain based at least in part on the metadata.

In an example embodiment, the data transfer mechanism is a one-way transfer device that only permits data to flow from the first security domain to the second security domain. In an example embodiment, the one or more data transfer limitations include one or more of a restriction on the file types that can be transferred from the first security domain to the second security domain, a limit on the size of files that can transferred from the first security domain to the second security domain, a limit on the cumulative size of files that can be in-flight from the first security domain to the second security domain at the same time, or a limit on the number of API calls that can be made.

In an example embodiment, the contents of the dataset include one or more of an object view, an ontology, or code. In an example embodiment, a first data stack of the first security domain is a subset of a second data stack of the second security domain.

In an example embodiment, the metadata includes a command log file, and the series of operations further includes ingesting, at the second security domain, the command log file, applying a transform to the ingested command log file, generating, based at least in part on the applied transform, a data ingest that includes the contents of the dataset to be synced, and triggering the data ingest to sync a corresponding dataset in the second security domain with the contents of the dataset.

It should be appreciated that systems disclosed herein can include any of the above-described features of example embodiments of the invention in any combination.

In an example embodiment, a computer-implemented method for automated syncing of data between security domains is disclosed. In an example embodiment, the method includes identifying a dataset to be synced between a first security domain and a second security domain, transferring contents of the dataset from the first security domain to the second security domain, transferring metadata associated with the dataset from the first security domain to the second security domain, and utilizing the metadata to sync a corresponding dataset in the second security domain with the transferred contents of the dataset from the first security domain.

Moreover, also disclosed herein are computer-implemented methods that incorporate any of the above-described features of example embodiments of the invention in any combination.

In addition, in example embodiments, computer program products are provided. The computer program products include non-transitory computer readable media readable by a processing circuit and storing instructions executable by the processing circuit to cause any of the above-described methods including any of the above-described features of example embodiments of the invention in any combination to be performed.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
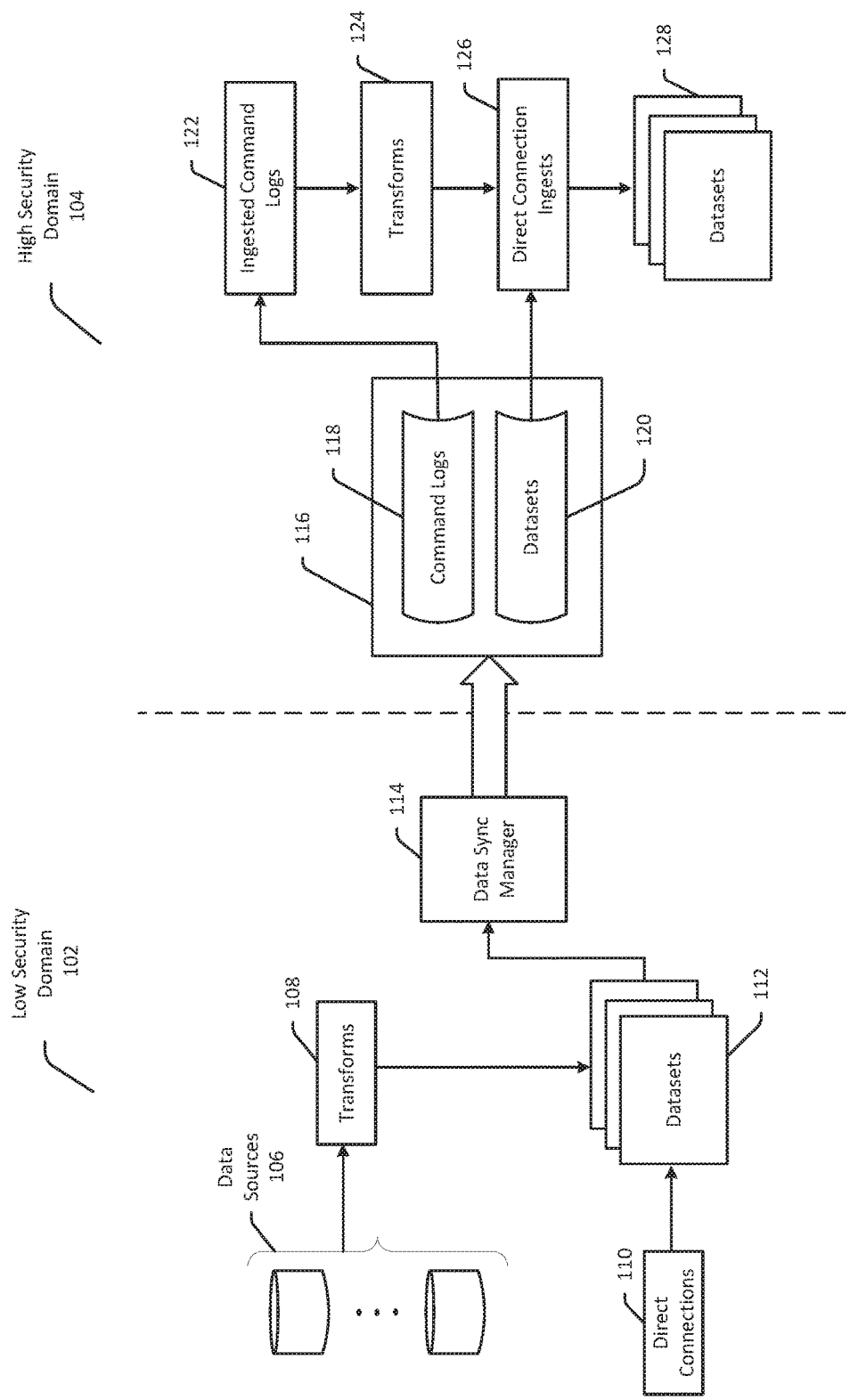
FIG. 1 schematically illustrates automated data syncing between security domains in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

A security domain is an environment with a set of resources that are accessible only by users or entities who have permitted access to those resources. At times, an organization's users may need to interact with multiple domains simultaneously, or a system or user within one security domain may need to communicate directly or obtain data from a system or user in a separate security domain. A cross-domain solution (CDS) can be implemented to achieve these objectives. A one-way transfer (OWT) device and a multidomain data guard are examples of a CDS. An OWT device (also referred to as a "diode") allows data to flow in a single direction from one security domain to another, while a multidomain data guard permits bidirectional data flow between security domains.

In an example scenario, a first security domain may include unclassified data while a second security domain may include unclassified and classified data. Thus, in this example scenario, at least some of the data in the second security domain (e.g., the classified data) has a heightened security level associated therewith as compared to any data in the first security domain. The first security domain may be referred to herein interchangeably as a low security domain, a low security side environment, or a low side environment, and the second security domain may be referred to herein interchangeably as a high security domain, a high security side environment, or a high side environment. Data corresponding to the two security domains may be maintained on separate stacks. It may be necessary to periodically transfer data from the first stack containing just the unclassified data in the low security side environment to the second stack containing both the unclassified data and the classified data in a high security side environment such that data on the second stack is synced with data on the first stack. For instance, pipelines, object view configurations, or the like created on the first stack need to be regularly and reliably ported over to the second stack.

A current approach for syncing the second stack with the first stack includes a combination of scripts, templates, and manual tasks. For code, scripts identify code repositories on the first stack in the low side environment, clone them, and then bundle them for delivery to the high side environment. Then, scripts executing in the high side environment force-push the code to the corresponding repositories on the second stack. For ontology and object views, templates can be used. More specifically, scripts can be run in the low side environment that trigger the update and export of a template covering ontology objects, their relations, their backing datasets, and their objects. For data, there is no current solution for moving data automatically across the stacks. Rather, the current approach is to transfer data from the first stack to the second stack manually on a one-off basis by a human operator certified to perform the transfer.

The aforementioned solutions currently employed to sync data between the stacks suffer from a number of technical drawbacks including, for example, failed continuous integration (CI) checks; inconsistencies that can occur between the path referenced in syncs, transforms, and the current path of a dataset due to a dataset being moved on the first stack; ontology changes that are rejected on the second stack due to ontology and backing dataset schemas not matching between the two stacks; the burden of transferring data manually on a one-off basis; and so forth.

Example embodiments of the invention provide technical solutions to the above-described technical problems associated with current approaches for syncing data between stacks of different security domains. These technical solutions are rooted in computer technology and overcome problems specifically arising in the realm of computer technology. More specifically, example embodiments of the invention relate to, among other things, systems, methods, and non-transitory computer readable media for automating the transfer/syncing of datasets or other artifacts from one security domain (e.g., a low side environment) to another security domain (e.g., a high side environment) in a seamless manner that ensures compliance with restrictions associated with a CDS between the two security domains while also ensuring data integrity and consistency between the two security domains.

Restrictions imposed by the CDS can include, for example, restrictions on the file types that can be transferred across security domains; limits on the size of files that can transferred; limits on the cumulative size of files that can be in-flight at the same time; limits on the number of API calls that can be made; and so forth. Example embodiments of the invention overcome these restrictions by deconstructing datasets in the low side environment such that the transfer of the datasets complies with data transfer restrictions associated with the CDS, transferring the deconstructed datasets and corresponding metadata from the low side environment to a high side environment, and reconstructing the datasets at the high side environment using the corresponding metadata.

More specifically, a data sync manager is provided that pushes the contents of a dataset from the low side environment to an output store along with metadata that contains enough information to allow for the datasets to be reconstructed in the high side environment. In example embodiments, the output store may be located in the low side environment or in the high side environment. In example embodiments, the metadata may include command logs that that identifies the datasets to be synced. In the high side environment, the commands log may be ingested into a dataset and processed by a transform, which can use an API call to update datasets in the high side environment with the new contents that were pushed from the low side environment. By using this dataset sync process as a primitive, object views, ontology, and code can be kept in sync by pulling their contents into a dataset, transferring the dataset from the low side environment to the high side environment, and then pushing those updates from a transform in the high side environment.

The data sync manager according to example embodiments of the invention has a number of technical features including the capability to push data as soon as it builds rather than waiting for a global snapshot and avoidance of unnecessary data transfer by pushing only data that has been updated. These technical features provide a technical solution to the technical problem of reliable transfer between data stacks of a large amount of data on a periodic basis (e.g., per day), with the further requirements that the data be synced within a reasonable threshold period of time (e.g., within 24 hours) and that file transfer restrictions are complied with. Conventional data transfer solutions are not capable of meeting these requirements. Accordingly, example embodiments of the invention provide a technical solution that addresses the inability of conventional data transfer solutions to meet such requirements, and thus, provide an improvement to computer technology, in particular, data transfer computer technology.

FIG. 1 schematically illustrates automated data syncing between security domains in accordance with an example embodiment of the invention. Two security domains are depicted in FIG. 1—a low security domain 102 and a high security domain 104. In example embodiments, the low security domain 102 may include a data stack that contains unclassified data, for example. In example embodiments, the high security domain 104 may include a data stack that contains both unclassified data as well as classified data. Thus, in example embodiments, the data hosted in the low security domain 102 may be a subset of the data hosted in the high security domain 104. As such, in example embodiments, as data is modified in the low security domain 102, it may be necessary to periodically sync those updates to the corresponding data stored in the high security domain 104.

In example embodiments, the data contained in the low security domain 102 may come from any of a variety of data sources 106. The data sources 106 may store various types of data including, without limitation, object views, ontologies, data schemas, computer-executable code, or the like. Data from any of the data sources 106 may be referred to herein as datasets. In example embodiments, one or more transforms 108 may be provided in the low security domain 102. In example embodiments, the transforms 108 may be configured to pull data from the data sources 106 via, for example, Application Programming Interface (API) calls. More specifically, in example embodiments, the transforms 108 may pull data from the data sources 106 via API calls into datasets 112 to be synced with corresponding data in the high security domain 104. In example embodiments, the datasets 112 include any of the types of data previously described including, without limitation, object views, ontologies, data schemas, computer-executable code, or the like. Further, in certain example embodiments, certain data in the low security domain 102 may be pulled into the datasets 112 via one or more direct connections 110 (e.g., REST). This data would not require the transforms 108 to pull in the data.

In example embodiments, a data sync manager 114 may be provided in the low security domain 102. The data sync manager 114 may be configured to facilitate an automated syncing of the datasets 112 between the low security domain 102 and the high security domain 104. In particular, in example embodiments, the data sync manager 114 may transfer the contents of the datasets 112 to an output store 116. The transferred datasets may be referred to herein as datasets 120. In certain example embodiments, the data sync manager 116 may perform various pre-processing on the datasets 112 prior to transferring the contents to the output store 116. For example, in example embodiments, the data sync manager 114 may perform pre-processing on the datasets 112 in order to ensure that requirements of the mechanism used to transfer data between the security domains 102, 104 are met. As previously noted, such requirements may include, without limitation, restrictions on the file types that can be transferred across security domains; limits on the size of files that can transferred; limits on the cumulative size of files that can be in-flight at the same time; limits on the number of API calls that can be made; and so forth.

In addition to the (optionally pre-processed) datasets 112, the data sync manager 114 may transfer metadata associated with the datasets 112 to the output store 116 as well. The metadata may include, for example, command logs 118 that, in turn, include information (e.g., file paths for datasets, transaction type information, etc.) that identifies the contents of the datasets 112 to be synced. For instance, in example embodiments, the command logs 118 may contain information to enable the datasets 112 to be reconstructed from the datasets 120 in the high security domain 104. More specifically, if, for example, the datasets 112 were pre-processed by the data sync manager 114 to reduce file sizes, the command logs 118 may be used to reconstruct the original files from the partitioned file segments in the transferred datasets 120.

As part of the data syncing process, in example embodiments, the command logs 118 may be ingested into a dataset 122. One or more transforms 124 may then be applied to the ingested command log dataset 122 to pull the contents of the datasets 120 into direct connection ingests 126. In example embodiments, the direct connection ingests 126 can be triggered to initiate the data sync process, specifically, the syncing of the updated data in datasets 112 in the low security domain 102 with corresponding datasets 128 in the high security domain 104.

Figure 3:
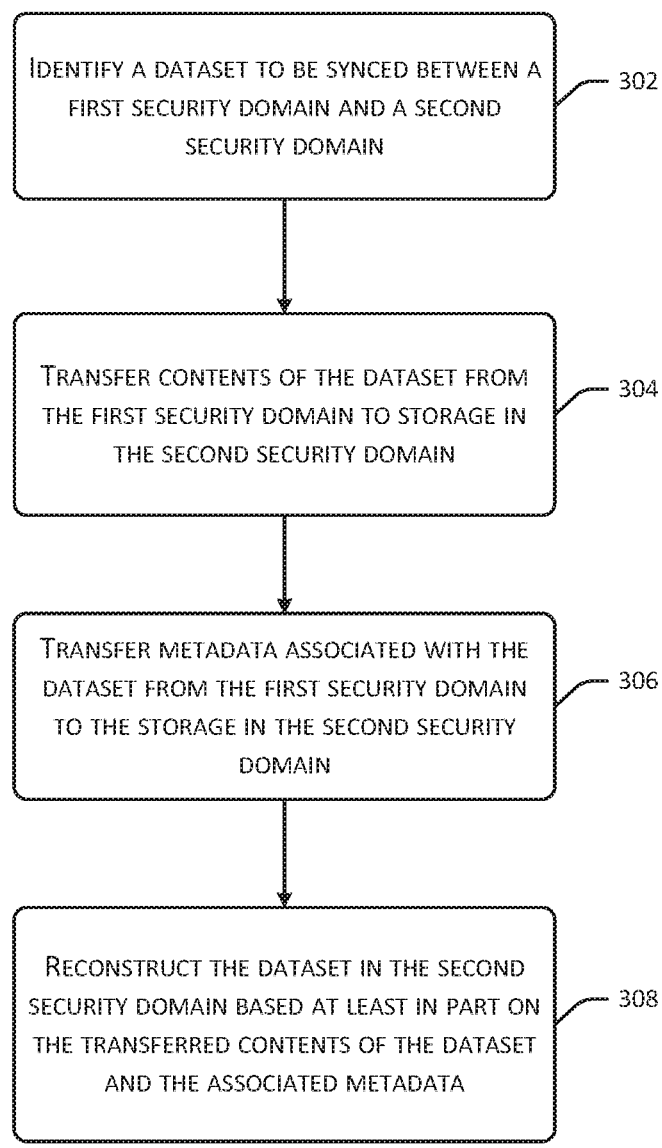
FIG. 3 is a process flow diagram of an illustrative method for automated data syncing between security domains in accordance with an example embodiment of the invention.

FIG. 3 is a process flow diagram of an illustrative method 300 for automated data syncing between security domains in accordance with an example embodiment of the invention. FIG. 3 will be described hereinafter, and at times, in reference to FIG. 1. Each operation of the method 300 and/or the method 400 (described in more detail later in this disclosure) can be performed by one or more of the engines/components depicted in FIG. 1 or 5, for example, whose operation will be described in more detail hereinafter. These engines/components can be implemented in any combination of hardware, software, and/or firmware. In certain example embodiments, one or more of these engines/components can be implemented, at least in part, as software and/or firmware modules that include computer-executable instructions that when executed by a processing circuit cause one or more operations to be performed. In other example embodiments, these engines/components may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

At block 302 of the method 300, a dataset to be synced between a first security domain and a second security domain may be identified. In example embodiments, the first security domain and the second security domain are the low security domain 102 and the second security domain, respectively, depicted in FIG. 1. In example embodiments, the dataset identified at block 302 may be any of the datasets 112 and the contents of the identified dataset may be pulled via API calls by the transforms 108 to any of the data sources 106 and/or via direct connections 110. In example embodiments, a data sync process may be initiated through a dataset application user interface (UI) or via scripts hitting a synchronizer endpoint. Further, in example embodiments, the data sync manager 114 may receive details regarding what data needs to be synced, based on which, the data sync manager 114 can identify the dataset at block 302, for example.

At block 304 of the method 300, contents of the dataset identified at block 302 may be transferred from the first security domain to the second security domain. Referring again to FIG. 1 for explanatory purposes, at block 304, the data sync manager 114 may retrieve files corresponding to the identified dataset 112 and write them to the output store 116, which may be located in the high security domain 104. In other example embodiments, the output store 116 may be located in the low security domain 102, in which case, the data sync manager 114 may first write contents of the identified dataset 112 to the output store 116, and then transfer the contents of the identified dataset 112 from the output store 116 to storage in the second security domain 104. In example embodiments, datasets written to the output store 116 may have a structure that includes, for example, a top-level date folder. The date folder may make manual zipping and transfer of updates easier (depending on the data transfer mechanism that is used). In example embodiments, a top-level date folder may also make replacing failed data transfers easier if transfer failures are time-correlated.

Further, in example embodiments, the contents of the identified dataset may first be processed prior to writing the contents to the output store 116 or otherwise transferring the dataset contents to the high security domain 104. In example embodiments, such processing may be performed in order to comply with restrictions associated with a data transfer mechanism used to transfer data from the low security domain 102 to the high security domain 104. For example, the processing may include breaking data files into smaller file sizes to meet file size transfer restrictions. As another non-limiting example, the processing may include converting one or more file types to one or more supported file types. As yet another non-limiting example, the processing may include performing more intensive data compression on the data. It should be appreciated the above-described examples of the types of the pre-processing that may be performed by the data sync manager 114 are merely illustrative and not exhaustive.

At block 306 of the method 300, metadata associated with the identified dataset may also be transferred from the first security domain to the second security domain. Referring again to FIG. 1, in example embodiments, the data sync manager 114 may generate and write the metadata to the output store 116. In example embodiments, the metadata may include one or more command logs 118. Each command log 118 may be, for example, a newline delimited JavaScript Object Notation (JSON) map. In example embodiments, a schema for each command log 118 may include a dataset path in the low security domain 102, a relative path to landing location in the high security domain 104 (the absolute dataset path in the high security domain 104 may be different), and a transaction type such as whether the associated dataset contains just updates to data made in the low security domain 102 or a snapshot.

At block 308 of the method 300, the dataset may be reconstructed in the second security domain based at least in part on the transferred contents of the dataset and the associated metadata. Referring again to FIG. 1 for explanatory purposes, at block 308, the command logs 118 may be used to identify, from the transferred datasets 120, the data to be synced with corresponding data in the high security domain 104. In particular, in example embodiments, the command logs 118 may be used to reconstruct data in the datasets 120 to, for example, reverse the effects of any pre-processing that was done on the data. For instance, if the data was segmented into smaller files, the command logs 118 may be used to re-combine the smaller file segments in the transferred datasets 120 to obtain the data files to be synced.

Figure 4:
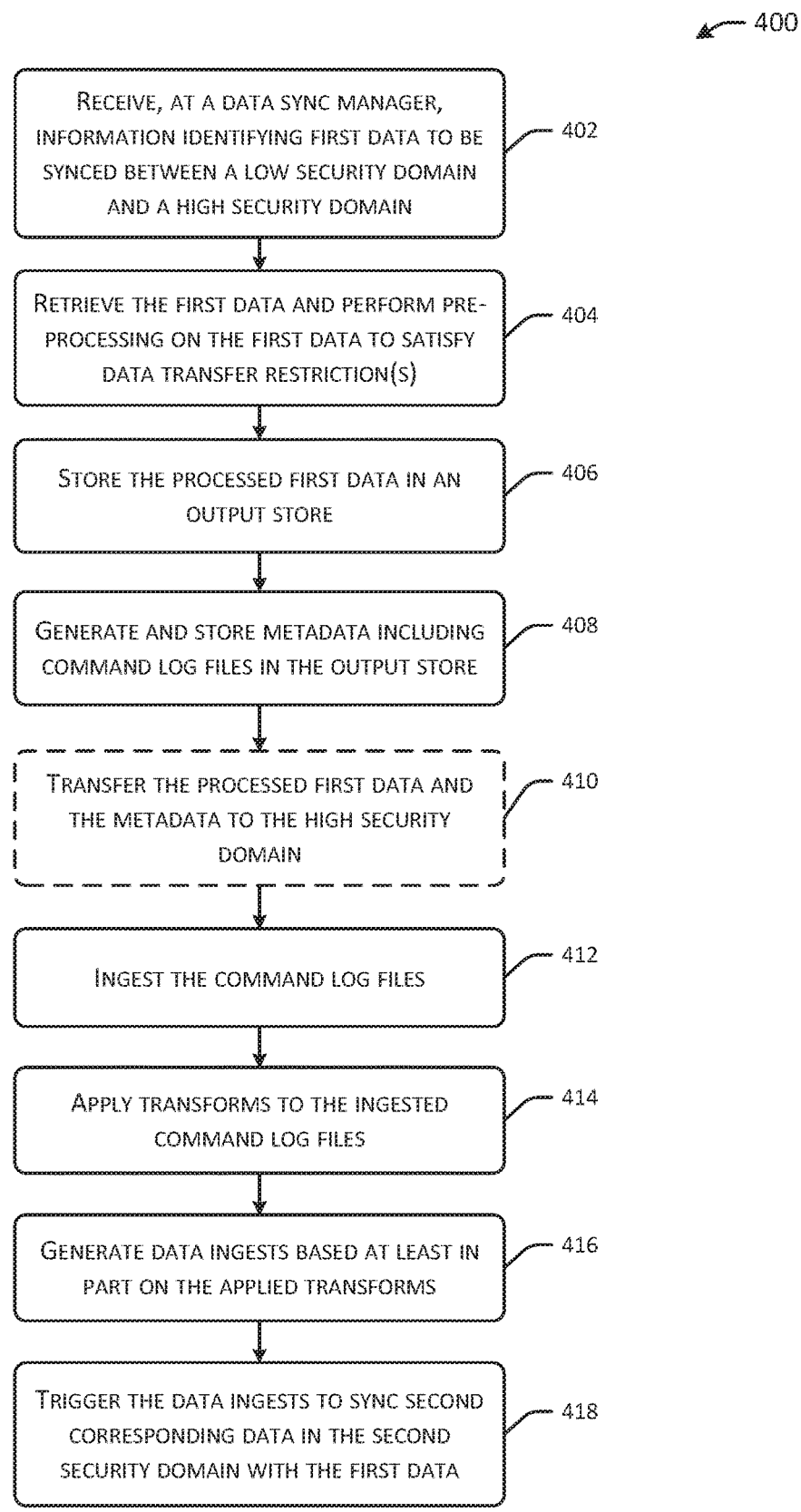
FIG. 4 is a process flow diagram of an illustrative more detailed method for automated data syncing between security domains in accordance with an example embodiment of the invention.

FIG. 4 is a process flow diagram of an illustrative more detailed method 400 for automated data syncing between security domains in accordance with an example embodiment of the invention. FIG. 4 will be described in reference to FIG. 1 for explanatory purposes.

At block 402 of the method 400, the data sync manager 114 may receive information identifying first data to be synced between the low security domain 102 and the high security domain 104. In example embodiments, the first data may include one or more of the datasets 112. In example embodiments, the data sync manager 114 may receive information indicating which data needs to be synced. The data sync manager 114 may identify the first data from this information.

In some example embodiment, the data to be synced may be selected manually. In other example embodiments, to data to be synced may be selected via execution of one or more scripts. Further, in some example embodiments, a plugin may be provided that queries the data sources 106 to publish their input and output datasets to the data sync manager 114. The data sync manager 114 may then be configured to take a set difference between the published input and output sets to identify the most upstream datasets across the entire data stack of the low security domain 102. The data sync manager 114 may then initiate syncs on those most upstream datasets.

At block 404 of the method 400, the data sync manager 114 may retrieve the first data and perform pre-processing on the first data to satisfy one or more data transfer restrictions (i.e., requirements imposed by a data transfer mechanism on data transfers between the security domains). In example embodiments, the data sync manager 114 may retrieve the first data by utilizing the transforms 108 to make API calls to pull the first data from any of the data sources 106. In other example embodiments, the data sync manager 114 may retrieve the first data via direct connections 110.

Figure 2:
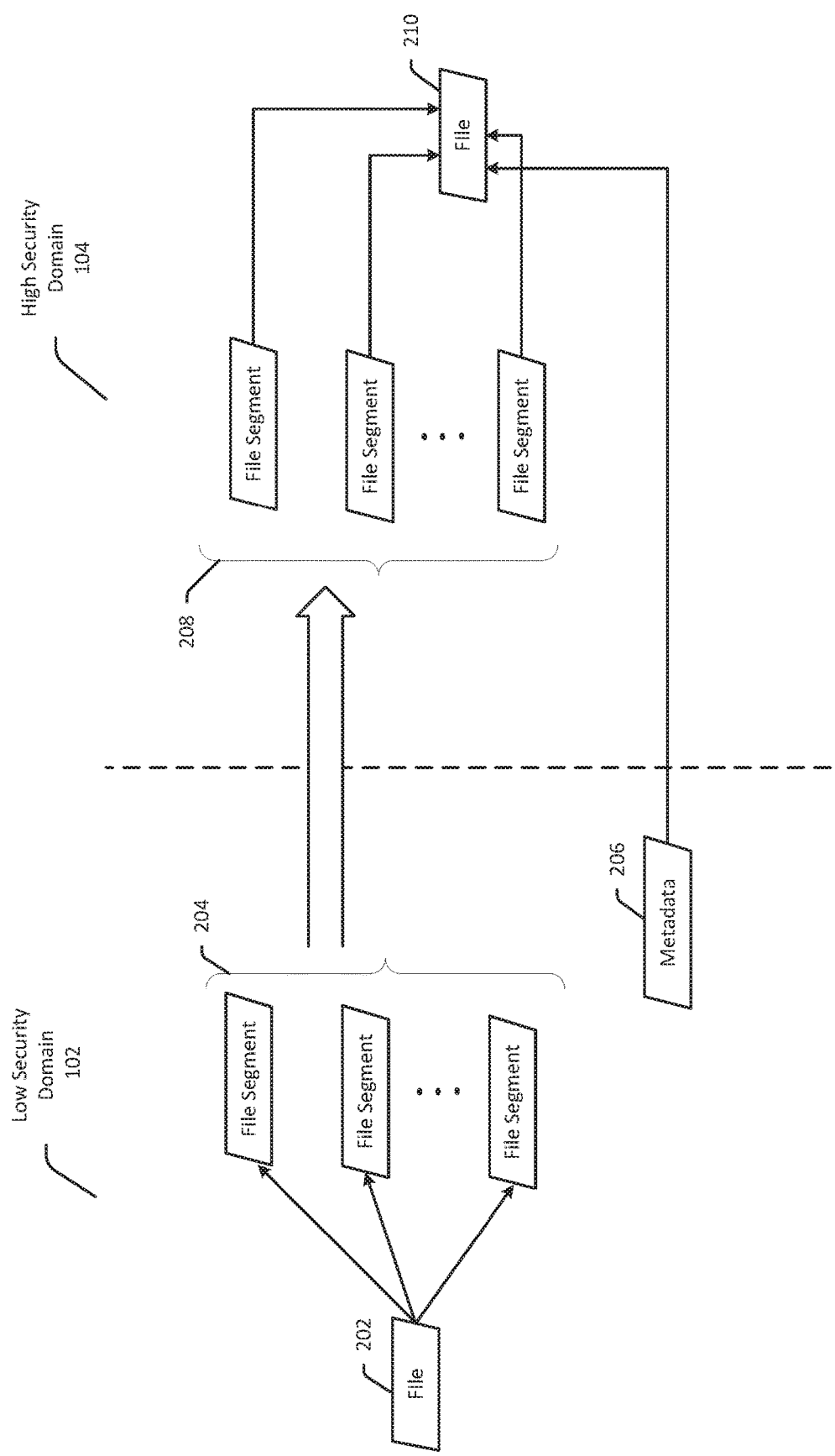
FIG. 2 schematically illustrates pre-processing performed on data to satisfy data transfer restriction(s) for transfer of data between security domains in accordance with an example embodiment of the invention.

In example embodiments, the processing performed by the data sync manager 114 at block 404 may include breaking data files into smaller file sizes to meet file size transfer restrictions. Referring now to FIG. 2, processing performed by the data sync manager 114 on an example file 202 to be synced may include dividing the file 202 into multiple file segments 204, each of which may be smaller in size than the file 202. In example embodiments, the file size of each file segment 204 may be less than a maximum file size that a data transfer mechanism permits. As another non-limiting example, the processing may include converting one or more file types of the first data to one or more supported file types such as, for example, converting a file from a parquet file format to a comma separated value (csv) file format. As yet another non-limiting example, the processing may include performing more intensive data compression on the first data.

At block 406 of the method 400, the data sync manager 114 may store the processed first data to the output store 116, which may be located in the high security domain 104. In other example embodiments, the output store 116 may be located in the low security domain 102. At block 408 of the method 400, the data sync manager 114 may generate and store metadata associated with the first data in the output store 116. In example embodiments, the metadata may include command log files 118, which may be, for example, JSON maps. In example embodiments, a schema for each command log 118 may include a dataset path in the low security domain 102, a relative path to landing location in the high security domain 104, and a transaction type such as whether the associated first data contains just updates to data made in the low security domain 102 or a snapshot.

In example embodiments, a command log file 118 may be written to the output store 116 in a manner that avoids having multiple writers conflict with each other, which can lead to corrupt or missing entries. In some example embodiments, the command log file 118 can be buffered in memory and written to the output store 116 periodically. In some other example embodiments, the command log file 118 can be appended to an existing file. In yet other example embodiments, a separate command log file 118 may be written to the output store 116 for each file to be transferred/synced.

At block 410 of the method 400, the data sync manager 114 may transfer the processed first data and the metadata from the low security domain 102 to the high security domain 104. This may be an optional step that may not be performed if, for example, the output store 116 is located in the second security domain 104, in which case, writing the processed first data and the metadata to the output store 116 would itself involve transferring the processed first data and the metadata from the low security domain 102 to the high security domain 104. If, on the other hand, the output store 116 is located in the low security domain 102, then the data sync manager 114 may transfer the processed first data and the metadata from the output store 116 to data storage located in the second security domain 104.

In example embodiments, the operations at blocks 402-410 may execute on one or more computing devices located in the first security domain 102. Further, in example embodiments, the operations at blocks 412-418 may execute on one or more computing devices located in the second security domain 104. Alternatively, in some example embodiments, one or more of any of the operations of the example method 400 may execute partially on one or more computing devices located in the first security domain 102 and one or more computing devices located in the second security domain 104.

At block 412 of the method 400, the command log files 118 may be ingested into a dataset 122. In example embodiments, the command log files 118 may be stored in a same directory of the output store 116 for each sync, thereby allowing for ease of ingesting the command log files 118 at block 412. In some example embodiments, in addition to identifying dataset file paths in the low security domain 102 and the high security domain 104, the command log files 118 may further identify the files in the dataset, the number of files in the dataset, the sync number, and so forth.

At block 414 of the method 400, one or more transforms 124 may be applied to the ingested command log files 122. In example embodiments, applying the transforms 124 may include processing the ingested command log files 122 to identify the most recent commands, which may require that the data sync process be performed as an incremental sync. Then, at block 416 of the method 400, data ingests 126 may be generated based at least in part on the applied transforms 124.

Generating the data ingests 126 may, in some example embodiments, involve reconstructing the datasets 112 from the transferred datasets 120 using the metadata (e.g., the command log files 118). For example, referring again to FIG. 2, the transferred metadata 206 (e.g., a command log file 118) may be used to identify the file segments 208 in the transferred datasets 120 that correspond to the file segments 204. Then the file segments 208 may be combined to reconstruct the file 202 in the low security domain 102 as the corresponding file 210 in the high security domain 104. While the metadata 206 is shown as going through the boundary between the low security domain 102 and the high security domain 104 separately from the file segments 204, it should be appreciated that this is for ease of explanation and depiction alone, and that the metadata 206 may be transferred across the domain as part of a payload that includes the file segments 204 or in a manner that otherwise corresponds to the same data transfer mechanism via which the file segments 204 are transferred between the domains. Further, in example embodiments, data integrity and validation checks may be performed to validated the reconstructed file 210 and ensure that integrity of the transferred data has been maintained.

At block 418 of the method 400, the data ingests 126 may be triggered to sync second corresponding data in the high security domain 104 with the first data in the low security domain 102. More specifically, triggering the data ingests 126 at block 418 may cause datasets 128 that include the contents of the datasets 112 to be synced with any updates to the contents of the datasets 112. In example embodiments, syncing the data at block 418 may include mapping a dataset path in the low security domain 102 to a dataset path in the high security domain 104. In addition, in example embodiments, syncing the data may further include mapping a relative path of the low security domain 102 export location to an expected path in the high security domain 104.

In some example embodiments, in order to leverage the substantially instantaneous nature of the data transfer between the security domains, the command log files 118 may be ingested at regular periodic intervals (e.g., every 1-5 minutes), with the transforms 124 responsible for ingesting this synced data trigger off the build of the metadata dataset. The transforms 124 may be incremental and may be able to update or create extracts to point to the synced data in the output store 116. In this manner, overwriting data can be avoided and several copies of syncs can be maintained. Holding several copies without overwriting synced datasets allows for transaction level syncing to be leveraged. In some example embodiments, in order to achieve transaction level syncing, it needs to be ensured that the metadata file (e.g., the command log file 118) is written after the dataset files 120 are written. In order to ensure this, the data sync manager 114 may wait for the successful syncing of all dataset files. Because the write of the dataset files to the output store 116, for example, can be serialized, the increased latency due to syncing the metadata file is small because the metadata file is small. In example embodiments, in order to ensure that metadata is written and general resource starvation is avoided, the data sync manager 114 may have its own queue that tracks files and metadata to be written to the output store 116.

Hardware Implementation

Figure 5:
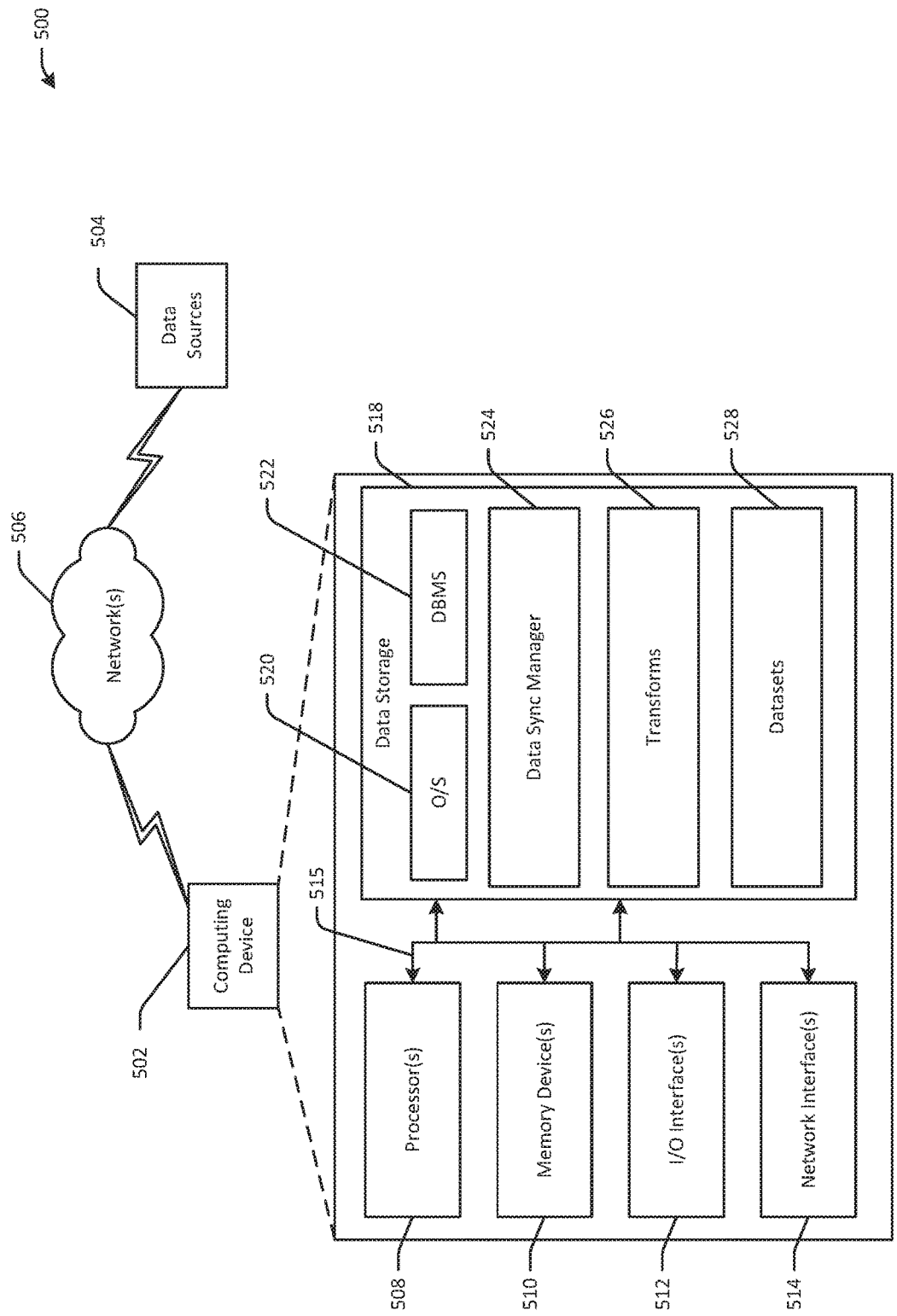
FIG. 5 is a schematic block diagram illustrating an example networked architecture configured to implement example embodiments of the invention.

FIG. 5 is a schematic block diagram illustrating an example networked architecture 500 configured to implement example embodiments of the invention. The networked architecture 500 can include one or more special-purpose computing devices 502 communicatively coupled via one or more networks 506 to one or more data sources 504. The data source(s) 504 may include any suitable data source capable of being accessed and/or searched including proprietary data sources, public data sources, or the like. Data stored in such data source(s) 504 may include structured data, unstructured data, or the like. More specifically, data in the data source(s) 504 may include object types, ontologies, data schemas, computer-executable code, or any other type of data. In example embodiments, the data source(s) may include any of the data sources 106.

The special-purpose computing device(s) 502 may be hard-wired to perform techniques of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 502 may also combine custom hard-wired logic, ASICs, or FPGAs with custom programming to accomplish the techniques. The special-purpose computing device(s) 502 may be desktop computer systems, server computer systems, portable computer systems, handheld devices, networking devices or any other device or combination of devices that incorporate hard-wired and/or programmed logic to implement the techniques.

The special-purpose computing device(s) 502 may be generally controlled and coordinated by operating system software 520. In other example embodiments, the computing device(s) 502 may be controlled by a proprietary operating system. The operating system software 520 may control and schedule computer processes for execution; perform memory management; provide file system, networking, and I/O services; and provide user interface functionality, such as a GUI.

While any particular component of the architecture 500 (e.g., the computing device(s) 502) may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of functionality described as being provided by a computing device 502 may be distributed among multiple computing devices 502.

The network(s) 506 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 can have any suitable communication range associated therewith and can include, for example, global networks (e.g., the Internet), metropolitan area networks (MANs), wide area networks (WANs), local area networks (LANs), or personal area networks (PANs). In addition, the network(s) 506 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 can include one or more processors (processor(s)) 508, one or more memory devices 510 (generically referred to herein as memory 510), one or more input/output ("I/O") interface(s) 512, one or more network interfaces 514, and data storage 518. The computing device 502 can further include one or more buses 515 that functionally couple various components of the computing device 502. In example embodiments, the data storage 518 may store various engines/program modules such as a track generation engine 524, a geo-rectification engine 525, and a training feedback engine 528. Each of these engines may include logic for performing any of the processes and tasks described earlier in connection with correspondingly referenced engines. In other example embodiments, each of the aforementioned engines may include hard-wired circuitry for performing corresponding techniques of the invention and/or circuitry or digital electronic devices such as one or more ASICs or FPGAs that are persistently programmed to perform such techniques.

The bus(es) 515 can include at least one of a system bus, a memory bus, an address bus, or a message bus, and can permit the exchange of information (e.g., data (including computer-executable code), signaling, etc.) between various components of the computing device 502. The bus(es) 515 can include, without limitation, a memory bus or a memory controller, a peripheral bus, an accelerated graphics port, and so forth. The bus(es) 515 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 510 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 518 can include removable storage and/or non-removable storage including, but not limited to, magnetic storage, optical disk storage, and/or tape storage. The data storage 518 can provide non-volatile storage of computer-executable instructions and other data. The memory 510 and the data storage 518, removable and/or non-removable, are examples of computer-readable storage media (CRSM) as that term is used herein. The data storage 518 can store computer-executable code, instructions, or the like that can be loadable into the memory 510 and executable by the processor(s) 508 to cause the processor(s) 508 to perform or initiate various operations. The data storage 518 can additionally store data that can be copied to memory 510 for use by the processor(s) 508 during the execution of the computer-executable instructions. Moreover, output data generated as a result of execution of the computer-executable instructions by the processor(s) 508 can be stored initially in memory 510 and can ultimately be copied to data storage 518 for non-volatile storage.

More specifically, the data storage 518 can store one or more operating systems (O/S) 520 and one or more database management systems (DBMS) 522 configured to access the memory 510 and/or one or more external datastore(s) (not depicted) potentially via one or more of the networks 506. In addition, the data storage 518 may further store one or more program modules, applications, engines, computer-executable code, scripts, or the like. For instance, the data storage 518 may store a data sync manager 524, transforms 526, and datasets 528. Any of the components depicted as being stored in the data storage 518 may perform similar functions to those described in connection with correspondingly named components depicted in earlier Figures. Further, any of the components depicted as being stored in the data storage 518 may be implemented as software and/or firmware that includes computer-executable instructions (e.g., computer-executable program code) loadable into the memory 510 for execution by one or more of the processor(s) 508 to perform any of the techniques described herein. Further, any data stored in the data storage 518 can be loaded into the memory 510 for use by the processor(s) 508 in executing computer-executable program code. In addition, any data stored in the data storage 518 can potentially be stored in one or more external datastores (not shown) that are accessible via the DBMS 522 and loadable into the memory 510 for use by the processor(s) 508 in executing computer-executable instructions/program code.

The processor(s) 508 can be configured to access the memory 510 and execute computer-executable instructions/program code loaded therein. For example, the processor(s) 508 can be configured to execute computer-executable instructions/program code of the various engines of the computing device 502 to cause or facilitate various operations to be performed in accordance with one or more embodiments of the invention. The processor(s) 508 can include any suitable processing unit capable of accepting data as input, processing the input data in accordance with stored computer-executable instructions, and generating output data. The processor(s) 508 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 can be made capable of supporting any of a variety of instruction sets.

Referring now to other illustrative components depicted as being stored in the data storage 518, the O/S 520 can be loaded from the data storage 518 into the memory 510 and can provide an interface between other application software executing on the computing device 502 and hardware resources of the computing device 502. More specifically, the O/S 520 can include a set of computer-executable instructions for managing hardware resources of the computing device 502 and for providing common services to other application programs. In certain example embodiments, the O/S 520 can include or otherwise control execution of one or more of the engines/program modules stored in the data storage 518. The O/S 520 can include any operating system now known or which can be developed in the future including, but not limited to, any server operating system, any mainframe operating system, or any other proprietary or non-proprietary operating system.

The DBMS 522 can be loaded into the memory 510 and can support functionality for accessing, retrieving, storing, and/or manipulating data stored in the memory 510, data stored in the data storage 518, and/or data stored in external datastore(s). The DBMS 522 can use any of a variety of database models (e.g., relational model, object model, etc.) and can support any of a variety of query languages. The DBMS 522 can access data represented in one or more data schemas and stored in any suitable data repository. Datastore(s) that may be accessible by the computing device 502 via the DBMS 522, can include, but are not limited to, databases (e.g., relational, object-oriented, etc.), file systems, flat files, distributed datastores in which data is stored on more than one node of a computer network, peer-to-peer network datastores, or the like. Generally speaking, the datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

Referring now to other illustrative components of the computing device 502, the input/output (I/O) interface(s) 512 can facilitate the receipt of input information by the computing device 502 from one or more I/O devices as well as the output of information from the computing device 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 502 or can be separate therefrom. The I/O devices can further include, for example, any number of peripheral devices such as data storage devices, printing devices, and so forth.

The I/O interface(s) 512 can also include an interface for an external peripheral device connection such as universal serial bus (USB), FireWire, Thunderbolt, Ethernet port or other connection protocol that can connect to one or more networks. The I/O interface(s) 512 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 can further include one or more network interfaces 514 via which the computing device 502 can communicate with any of a variety of other systems, platforms, networks, devices, and so forth. The network interface(s) 514 can enable communication, for example, one or more other devices via one or more of the network(s) 506. In example embodiments, the network interface(s) 514 provide a two-way data communication coupling to one or more network links that are connected to one or more of the network(s) 506. For example, the network interface(s) 514 may include an integrated services digital network (ISDN) card, a cable modem, a satellite modem, or a modem to provide a data communication connection to a corresponding type of telephone line. As another non-limiting example, the network interface(s) 514 may include a local area network (LAN) card to provide a data communication connection to a compatible LAN (or a wide area network (WAN) component to communicate with a WAN). Wireless links may also be implemented. In any such implementation, the network interface(s) 514 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 506 and the signals on network links and through the network interface(s) 514, which carry the digital data to and from the computing device 502, are example forms of transmission media. In example embodiments, the computing device 502 can send messages and receive data, including program code, through the network(s) 506, network links, and network interface(s) 514. For instance, in the Internet example, a server might transmit a requested code for an application program through the Internet, the ISP, a local network, and a network interface 514. The received code may be executed by a processor 508 as it is received, and/or stored in the data storage 518, or other non-volatile storage for later execution.

It should be appreciated that the engines depicted in FIG. 5 as part of the computing device 502 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 502 and/or hosted on other computing device(s) (e.g., 502) accessible via one or more of the network(s) 506, can be provided to support functionality provided by the engines depicted in FIG. 5 and/or additional or alternate functionality. In addition, engines that support functionality described herein can be implemented, at least partially, in hardware and/or firmware and can be executable across any number of computing devices 502 in accordance with any suitable computing model such as, for example, a client-server model, a peer-to-peer model, and so forth.

It should further be appreciated that the computing device 502 can include alternate and/or additional hardware, software, and/or firmware components beyond those described or depicted without departing from the scope of the invention. More particularly, it should be appreciated that software, firmware, and/or hardware components depicted as forming part of the computing device 502 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 502. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being redefined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A system, comprising:
   at least one processor; and
   at least one memory storing computer-executable instructions, wherein the at least one processor is configured to access the at least one memory and execute the computer-executable instructions to:
   identify a dataset to be synced between a first security domain and a second security domain;
   process the dataset, wherein the processing comprises partitioning a file in the dataset into a plurality of file segments, each of the plurality of file segments being smaller than a threshold file size permitted for transferring data between the first security domain and the second security domain;
   store information of the processing in a command log;
   transfer contents of the dataset from the first security domain to the second security domain, wherein the transferring of the contents of the dataset comprises:

transferring the plurality of file segments from the first security domain to the second security domain;
transfer metadata associated with the dataset from the first security domain to the second security domain, wherein the metadata comprises the command log, and a file path of a corresponding dataset in the second security domain;
combine the plurality of file segments in the second security domain to reconstruct the file based on the command log identifying the dataset to be synced; and
utilize the metadata to sync the corresponding dataset in the second security domain with the file from the first security domain based on the file path of the corresponding dataset, the file path identifying the contents of the dataset to be synced, wherein the syncing comprises an incremental sync between the contents of the data from the first security domain and the corresponding dataset in the second security domain.

2. The system of claim 1, wherein the at least one processor is further configured to execute the computer-executable instructions to:
transfer the plurality of file segments from the first security domain to an output store; and
transfer the metadata from the first security domain to the output store.

3. The system of claim 2, wherein the output store is located in the first security domain, and wherein the plurality of file segments and the metadata are transferred from the output store to the second security domain.

4. The system of claim 2, wherein the output store is located in the second security domain, and wherein transfer of the plurality of file segments and the metadata to the second security domain is achieved by transfer of the plurality of file segments and the metadata to the output store.

5. The system of claim 1, wherein the at least one processor is further configured to execute the computer-executable instructions to:
generate the dataset in the first security domain by deconstructing data such that the transfer of the plurality of file segments satisfies one or more data transfer limitations associated with a data transfer mechanism used to transfer the plurality of file segments from the first security domain to the second security domain; and
reconstruct the dataset in the second security domain based at least in part on the metadata.

6. The system of claim 5, wherein the one or more data transfer limitations comprise one or more of a restriction on the file types that can be transferred from the first security domain to the second security domain, a limit on the cumulative size of files that can be in-flight from the first security domain to the second security domain at the same time, or a limit on the number of API calls that can be made.

7. The system of claim 1, wherein the plurality of file segments comprise one or more of an object view, an ontology, or code.

8. The system of claim 1, wherein a first data stack of the first security domain is a subset of a second data stack of the second security domain.

9. The system of claim 1, wherein the at least one processor is further configured to execute the computer-executable instructions to:
ingest, at the second security domain, the command log file;
apply a transform to the ingested command log file;
generate, based at least in part on the applied transform, a data ingest comprising the plurality of file segments to be synced; and
trigger the data ingest to sync the corresponding dataset in the second security domain with the file from the first security domain.

10. The system of claim 5, wherein the data transfer mechanism is a one-way transfer device that only permits data to flow from the first security domain to the second security domain.

11. A computer-implemented method for automated syncing of data between security domains, the method comprising:
identifying a dataset to be synced between a first security domain and a second security domain;
processing the dataset, wherein the processing comprises partitioning a file in the dataset into a plurality of file segments, each of the plurality of file segments being smaller than a threshold file size permitted for transferring data between the first security domain and the second security domain;
storing information of the processing in a command log;
transferring contents of the dataset from the first security domain to the second security domain, wherein the transferring of the contents of the dataset comprises:
transferring the plurality of file segments from the first security domain to the second security domain;
transferring metadata associated with the dataset from the first security domain to the second security domain, wherein the metadata comprises the command log and a file path of a corresponding dataset in the second security domain;
combining the plurality of file segments in the second security domain to reconstruct the file based on the command log identifying the dataset to be synced; and
utilizing the metadata to sync the corresponding dataset in the second security domain with the file from the first security domain based on the file path of the corresponding dataset, the file path identifying the contents of the dataset to be synced, wherein the syncing comprises an incremental sync between the contents of the data from the first security domain and the corresponding dataset in the second security domain.

12. The computer-implemented method of claim 11, further comprising:
transferring the plurality of file segments from the first security domain to an output store; and
transferring the metadata from the first security domain to the output store.

13. The computer-implemented method of claim 12, wherein the output store is located in the first security domain, and wherein the plurality of file segments and the metadata are transferred from the output store to the second security domain.

14. The computer-implemented method of claim 12, wherein the output store is located in the second security domain, and wherein transfer of the plurality of file segments and the metadata to the second security domain is achieved by transfer of the plurality of file segments and the metadata to the output store.

15. The computer-implemented method of claim 11, further comprising:
deconstructing data such that the transfer of the plurality of file segments satisfies one or more data transfer limitations associated with a data transfer mechanism used to transfer the plurality of file segments from the first security domain to the second security domain; and reconstructing the dataset in the second security domain based at least in part on the metadata.

16. The computer-implemented method of claim 15, wherein the one or more data transfer limitations comprise one or more of a restriction on the file types that can be transferred from the first security domain to the second security domain, a limit on the cumulative size of files that can be in-flight from the first security domain to the second security domain at the same time, or a limit on the number of API calls that can be made.

17. The computer-implemented method of claim 11, wherein a first data stack of the first security domain is a subset of a second data stack of the second security domain.

18. The computer-implemented method of claim 11, further comprising:
ingesting, at the second security domain, the command log file;
applying a transform to the ingested command log file;
generating, based at least in part on the applied transform, a data ingest comprising the plurality of file segments to be synced; and
triggering the data ingest to sync the corresponding dataset in the second security domain with the file from the first security domain.

19. The computer-implemented method of claim 15, wherein the data transfer mechanism is a one-way transfer device that only permits data to flow from the first security domain to the second security domain.

20. The computer-implemented method of claim 11, wherein the utilizing the metadata to sync comprises:
generating a plurality of copies of syncs related to the dataset without overwriting data, wherein each of the plurality of copies of syncs corresponding to a transaction executed on the dataset in the first security domain; and
performing transaction-level syncing between the transferred contents of the file from the first security domain and the corresponding dataset in the second security domain based on the plurality of copies of sync.

* * * * *